NONLINEAR DECODER

Filed Sept. 23, 1966

Inventors
JEAN PIERRE LE CORRE
RENÉ P. A. M. LEFEVRE
ALFRED PIROTTE
By Philip M. Bolton
Attorney Feb. 10, 1970 J. P. LE CORRE ET AL 3,495,237

NONLINEAR DECODER

Filed Sept. 23, 1966 3 Sheets-Sheet 2

Inventors
JEAN PIERRE LE CORRE
RENÉ P.A.M. LEFEVRE
ALFRED PIROTTE
By Philip M. Bolton
Attorney

NONLINEAR DECODER

Inventors
JEAN PIERRE LE CORRE
RENÉ P. A. M. LEFEVRE
ALFRED PIROTTE
By Philip M. Bolton
Attorney United States Patent Office
3,495,237
Patented Feb. 10, 1970

3,495,237
NONLINEAR DECODER

Jean Pierre Le Corre, Sainte-Genevieve-des-Bois, Rene Pierre Alexandre Marcel Lefevre, Igny, and Alfred Pirotte, Paris, France, assignors to International Standard Electric Corporation, New York, N.Y., a corporation of Delaware Filed Sept. 23, 1966, Ser. No. 581,605
Claims priority, application France, Sept. 23, 1965, 32,457
Int. Cl. H04l *3/00;* H03k *13/00*
U.S. Cl. 340—347 10 Claims

ABSTRACT OF THE DISCLOSURE

The digits of a code group to be decoded are stored in stages of a register. A ladder attenuator is provided and current generators are selectively coupled to the input points of the attenuator. A decoder responds to the $x$ most significant stored digits to produce a first control signal indicating the lower voltage of a segment of the input-output characteristic represented by the stored code group. The first control signal activates appropriate ones of the current generators. The $m$ least significant stored digits produce a second control signal indicating the position along the segment represented by the stored code group. The second control signal is coupled in common to gates coupled to each of the input points of the attenuator. The gates are selectively controlled to couple the second input signal to the output points of the attenuator. The analog signal is present at the output of the attenuator.

The present invention concerns a device for decoding a binary number into an analog value, the characteristic of which is not linear and presents a discontinuous trace.

Such a digital to analog decoder with a nonlinear characteristic may be used as a decoder-expander and also as a decoder associated with coder-compressor, the coding being carried out by the feedback comparison method.

It should be remembered that this coding method consists in comparing the analog value corresponding to a number stored in a register to the input signal which must be coded, thus enabling the determination of whether the number is too great or too small. In the first case, the number is reduced. In the second case, it is increased. These comparison operations are continued until the compared voltages differ at most by the value of one quantizing step.

When the decoder used in nonlinear, the coding is carried out according to a nonlinear characteristic curve. Since the same decoder may be used for coding and for decoding, the compresstion and expansion characteristics are then perfectly complementary, if said decoder presents stable and reproducible characteristics.

Nonlinear decoders are known which use a network of resistances to obtain an hyperbolic characteristic. These resistances, the extreme values of which are in the ratio of $2^n$, must be switched in accordance with the value of the number to be decoded. But it is known that a resistor presents a certain reactance which depends upon its resistive value. If the switching frequency is high, the effect of this reactance becomes important, and the value of the corresponding complex impedance depends upon the number to be decoded. It is realized, thus, that a decoder comprising resistances, the value of which are so dissimilar, is difficult to achieve and cannot present a high accuracy.

Besides, when an electronic switch is used for sampling the input signal, said switch presents, when it is conducting, a series resistance (saturation resistance, in the case of a transistor) which is not negligible with respect to the low value resistors of the network, and which introduces a now source of error. In order to overcome the difficulties of obtaining a continuous nonlinear characteristic, a description has been made, in the copending applicaiton of M. L. Avignon and A. Y. LeMaout, Ser. No. 341,035, filed Jan. 29, 1964, now U.S. Patent No. 3,298,017, characteristic curve is built up of a series of straight line segments of different slopes; these slopes being chosen in such a way as, for instance, to be approximately tangent to a logarithmic curve.

The operation of this decoder wil be briefly described by assuming that the numbers or codes whch are appled to it comprise $n=7$ digts, and that the voltages corresponding to the codes zero and $2^n-1$ are respectively equal to zero and E*d*, the codes $2^{n-1}-1$ and $2^{n-1}$ being located on both sides of the voltage *Ed*/2 which characteristizes the mean value of the signal in the case where one encodes periodic voltages. Each of these voltage ranges of amplitude *Ed*/2 is divided into three coding zones C1, C2, C3, to which correspond respectively, thirty-two, sixteen and sixteen codes, and in which the values of the quantizing steps are different. Thus, in the zone C1—which corresponds to a weakest voltages in absolute value on both sides of the origin—the value of this quantizing step is equal to V. In the zone C2, it equal to 8V, and the zone C3 it is equal to 64V. A characteristic curve is thus defined which is made up of six segments, the slopes of which are proportional to the different values of the quantizing steps.

In order to obtain the analog voltage corresponding to a given code, the zone to which it belongs is first defined, this operation being carried out easily by decoding its three most significant digits, since each zone comprises a number of codes equal to an integral power of two.

The zone signal thus obtained is used, first, for generating a base voltage or "pedestal," equal to the voltage which corresponds to the maximum code of the immediately preceding zone, and, second, a complementary voltage representing the code position in the zone to which it belongs; this voltage being obtained by a linear decoding of the less significant digits with a weighting corresponding to the value of the quantizing step in the zone. These two voltages are then added in order to obtain the analog voltage corresponding to the code.

The present invention concerns a decoder of the same type in which are carried out the operations of zone determination, of pedestal and complementary voltage generation, and of addition of these voltages. It differs therefrom by the fact that the characteristic curve comprises four zones with a particular choice of the quantizing step values and by the fact that the circuits have been considerably simplified.

The object of the present invention is to realize a nonlinear decoder with a discontinous characteristic of simple achievement.

The present invention will be particularly described with refernce to the accompanying drawings in which:

FIGS. 1(*a*) to 1(*g*) represents a certain number of symbols used in FIG. 3;

Before starting the description of the invention, we shall briefly describe the principle of notations in logical algebra which will be used in certain cases, in order to simplify the description of the logical operations. The subject is treated extensively in numerous papers and in particular in the book "Logical Design of Digital Computers" by M. Phister (J. Wiley—publisher).

Thus, if a condition characterized by the presence of a signal is written A, the condition characterized by the absence of said signal will be written $\overline{A}$.

These two conditions are linked by the well known logical relation $A\times\overline{A}=0$, in which the sign "*x*" is the symbol of the coincidence logical function or "AND" function.

If a condition C appears only if the conditions A and B are simultaneously present, one writes $A\times B=C$ and this function may be carried out by means of a coincidence or AND circuit.

If a condition C appears when at least one of two conditions E and F is present, one writes $E+F=C$ and this function is carried out by means of a mixing gate or OR circuit.

Figure 3:
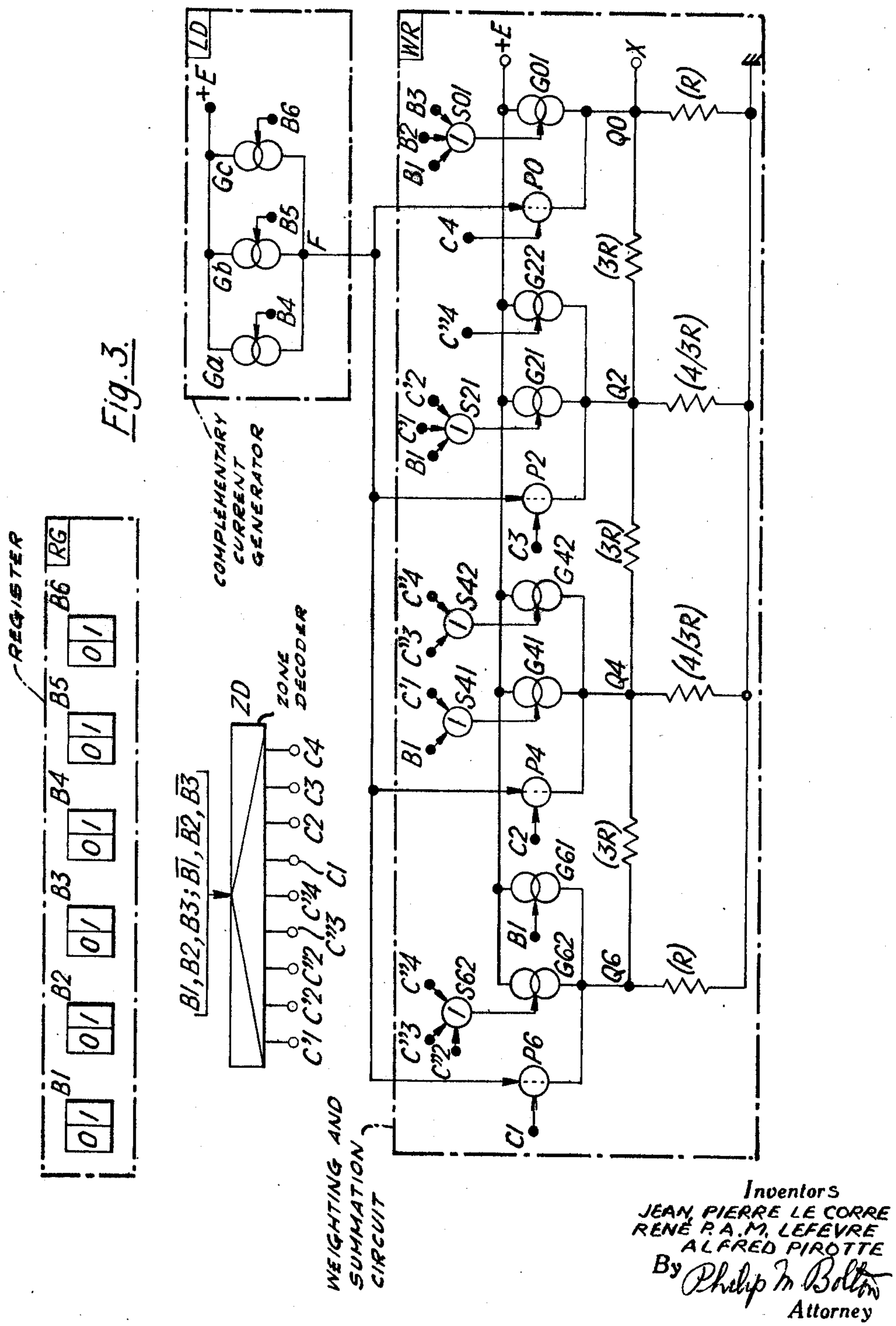
FIG. 3 represents the detailed block diagram of this decoder.

One will also specify, in relation with FIG. 1(*a*) to 1(*g*), the meaning of some particular symbols used in FIG. 3 thus:

FIG. 1(*a*) represents a simple AND circuit;

FIG. 1(*b*) represents a simple OR circuit;

FIG. 1(*c*) represents a bistable circuit or "flip-flop" to which a control signal is applied over one of its input terminals 92–1 or 92–0 in order to set it in the 1 state or to reset it in the 0 state. A voltage of same polarity as that of the control signal is present, either on the output 93–1 when the first flip-flop is in the 1 state, or on the output 93–0 when it is in the 0 state. If the flip-flop is referenced B1, the logical condition which characterizes the fact that it is in the 1 state will be written B1 and that characterizing the fact that it is in the 0 state will be written $\overline{B1}$;

FIG. 1(*d*) represents a multiplexing of conductors so that, in the shown example, ten output conductors **94*j* are connected in parallel to the same input conductor 94*h*;**

FIG. 1(*e*) represents a decoder which, in the case of the example, transforms a four-digit binary code group applied over the group of conductors **94*a* into a 1 out of 16 codes, so that a signal appears on only one among the sixteen conductors 94*b*** for each one of the code groups applied at the input;

FIG. 1(*f*) represents a current generator which, when activated by a control signal applied to its terminal **94*c*,** delivers a constant current I in the load resistor R;

FIG. 1(*g*) represents a coincident electronic gate which, when activated by a signal applied to its terminal **96*d*, controls the transfer of an amplitude modulated signal from the terminal 96*e* to the terminal 96*f*.**

The location of a flip-flop in a counter or in a register or the order number of a given digit in the same elements will be characterized by a particular expression.

Thus, the flip-flop of rank 1 will designate the flip-flop in which will be stored the value of the most significant digit of the number. The flip-flop of rank 2 will be that in which will be stored the value of the next less significant digit, etc. . . . .

Figure 2:
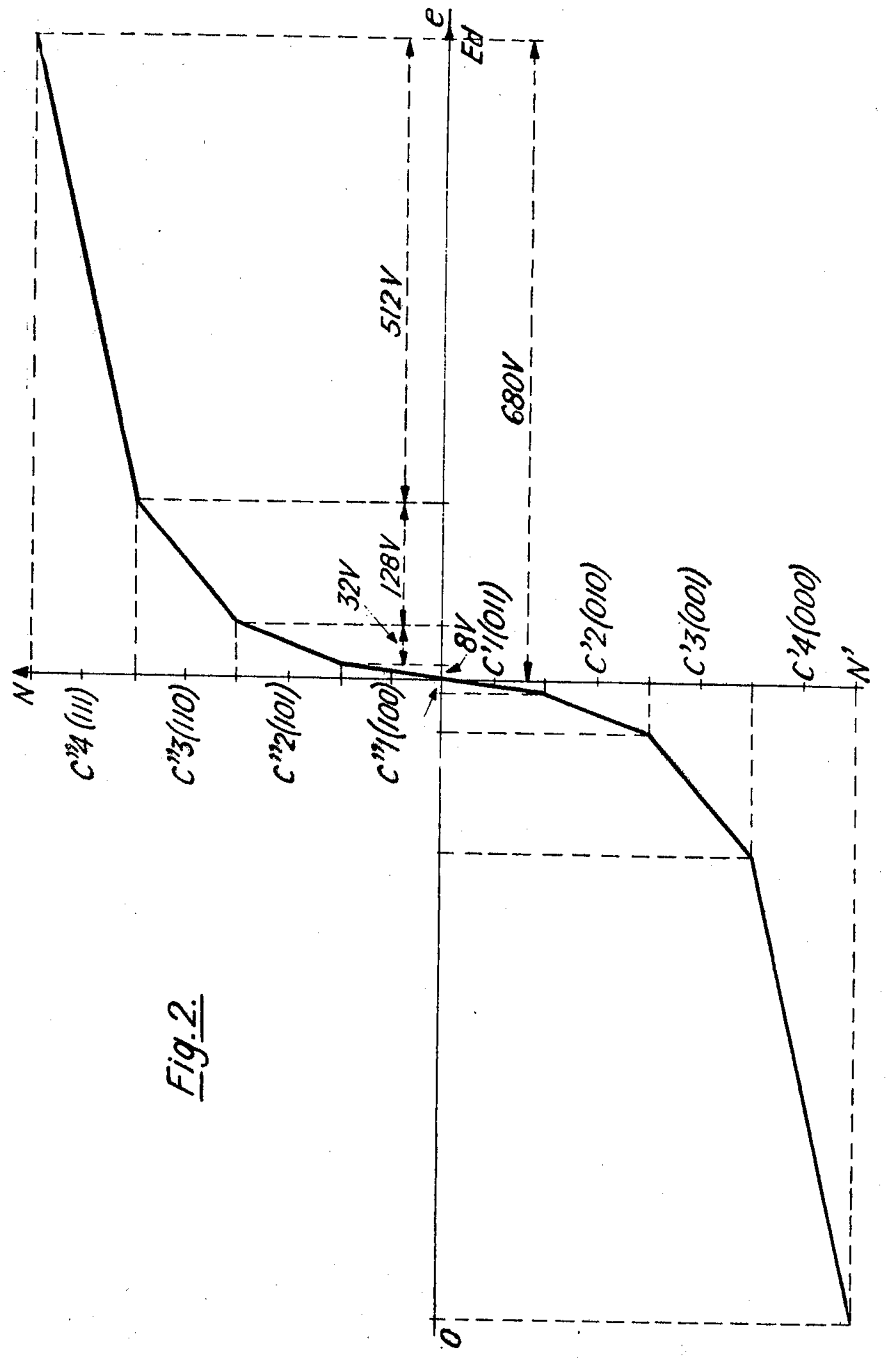
FIG. 2 represents the characteristic curve of the decoder according to the present invention.

FIG. 2 represents the characteristic curve $e=f$ $(N)$ of the decoder according to the invention.

On this figure the codes formed by the three most significant digits have been represented, between brackets, on the ordinate axis N'IN, and the range of decoded voltages which extend from zero volt to E*d* has been represented on the abscissae axis OI*e*. The characteristic curve of this decoder presents a non continuous trace, i.e., it is made up of a succession of straight line segments of different slopes. It is symmetrical with respect to the point I, and presents in each one of the first and third quadrants, four coding zones, the ratio between the slopes of the adjacent zones in each of these quadrants being four, as it may be seen in Table I hereafter, the column 1 of which is assigned to the zones C1 to C4, the column 2 to the slope in each one of these zones (in volts per code, if the value V of the unit quantizing step is given in volts), the column 3 to the number of codes per zone, the column 4 to the number of unit quantizing steps referenced "QS" in each zone, and the column 5 to the fraction of the range of voltages E*d*/2 occupied by each zone.

TABLE I

| 1 | 2 | 3 | 4 | 5 |
|---|---|---|---|---|
| Zones | Slope | Nb of codes | Number of QS in the zone | Fraction of—Ed/2 |
| C1 | V | 8 | 8 | 1/85 |
| C2 | 4 V | 8 | 32 | 4/85 |
| C3 | 16 V | 8 | 128 | 16/85 |
| C4 | 64 V | 8 | 512 | 64/85 |
| Total number of unit quantizing steps | | | 680 | |

In FIG. 2, the coding zones concerning the codes wherein the digit of rank 1 has the value 0 have been referenced C'1 to C'4 and those concerning the codes wherein the digit of rank 1 has the value 1 have been referenced C''1 to C''4. Since the characeristic curve is symmetrical with respect to the origin I of the coordinates, it is understood that, for instance, the zone C1 of Table I corresponds to the zones C'1 and C''1 of FIG. 2. The construction of the characteristic curve in each one of the quadrants it occupies is deduced easily from the indications given in the column 5 of Table I.

FIG. 3 represents the general block diagram of the decoder according to the invention which comprises:

The register RG comprising the flip-flops B1 to B6 for the storage of codes comprising $n=6$ digits;

The zone decoder ZD;

The complementary current generator LD;

The weighting and summation circuit WR which delivers, on its output X, a voltage characterizing the value of the code stored in the register RG.

The ouput terminals of the flip-flops B1 to B3 are applied to the zone decoder which comprises the outputs C'1, C'2, C''2 to C''4 characterizing the zones defined by the digits of rank 1, 2 and 3, such as they are represented between brackets in FIG. 2, as well as the output terminals C1 to C4, for which one has, for instance, the logical relation: $C1=C'1+C''1$. The complementary current generator LD comprises the current generators G*a*, G*b*, G*c*, controlled respectively by the signals B4, B5, B6. They deliver, respectively, currents of amplitude $I/2$, $I/4$, $I/8$, over the common output conductor F. This current, injected in a particular point of a ladder attenuator located in the circuit WR delivers on its output terminal *X*, a complementary voltage depending upon the zone to which the code belongs.

The weighting and summation circuit WR comprises a ladder attenuator supplied by current generators, the manner of operation of which, well known in itself, has been described in the Patent mentioned hereabove.

Since the end shunt resistors of this attenuator have a value R, by choosing values $4R/3$ and 3R, respectively, for the other shunt and series resistors, one obtains an attenuator of characteristic impedance $4R/5$ which brings an insertion loss of four per cell.

It results therefrom that, if a current I is injected at the point Q$o$, a voltage $Vx=4RI/5$ appears between the point X and the ground and that, if the injection point is shifted towards the left side of the figure, the voltage V$x$ decreases by a ratio of four each time. It is, thus, seen that the attenuation ratio is a negative even power of two, and that a current injected at the point Q2 generates a voltage attenuated by a ratio $2^{-4}=1/16$ with respect to the same current injected at the point Q$o$.

Besides, if one injects, in a given point, currents supplied by two identical generators having a high internal resistance with respect to the characteristic impedance of the attenuator, said currents add up and the output voltage doubles.

The mode of generation of the pedestal voltages will be first described, remembering that the three most significant digits of the code defines the zone to which it belongs.

The voltages corresponding to the codes belonging to the zone C'4 range between zero volt for the code, the decimal equivalent of which is zero, and $$512V-64V=448V$$

for the code, the decimal equivalent of which is seven (see Table I). These are complementary voltages supplied, as it will be seen further on, by the circuit LD.

For the code, the decimal equivalent of which is eight, and which belongs—as the next codes 9 to 15—to the zone C'3, the voltage corresponding to the zone C'4 are replaced by a pedestal voltage $U'o=512V$. For the codes 9 to 15, complementary voltages of amplitude proportional to the position of the code in the zone C'3 and to the value of the quantizing step in this zone, are added to this voltage U'$o$.

At each zone passage, the operation is carried out in a similar way by adding a new pedestal voltage equal to the range of voltages covered by the preceding zone. For the zone C''1, the pedestal is constituted by the voltages $U'o+U'2+U'4+U'6$. For the zone C''2 and the following zones, new voltages U''6, U''4, U''2, are added.

Table II hereafter represents the different pedestal voltages used. It comprises the lines 1, 2, 3, reversed, respectively, to the values—in unit quantizing steps—of each voltage, to the reference of these voltages and to the reference of the current generators set into operation in the circuit WR.

TABLE II

| | | | | | Weighing | | | | | | |
|---|---|---|---|---|---|---|---|---|---|---|---|
| a | b | | | 1 | 512 | 128 | 32 | 8 | 8 | 32 | 128 |
| | Zone decoding | | | 2 | U'/o | U'2 | U'4 | U''6 | U''6 | U''4 | U''2 |
| Zone | B 1 | B2 | B3 | 3 | G01 | G21 | G41 | G61 | G62 | G42 | G22 |
| C'4 | 0 | 0 | 0 | | | | | | | | |
| C'3 | 0 | 0 | 1 | | X | | | | | | |
| C'2 | 0 | 1 | 0 | | X | X | | | | | |
| C'1 | 0 | 1 | 1 | | X | X | X | | | | |
| C''1 | 1 | 0 | 0 | | X | X | X | X | | | |
| C''2 | 1 | 0 | 1 | | X | X | X | X | X | | |
| C''3 | 1 | 1 | 0 | | X | X | X | X | X | X | |
| C''4 | 1 | 1 | 1 | | X | X | X | X | X | X | X |

This table comprises also the columns $a$ and $b$, assigned respectively to the eight coding zones and to the three most significant digits of the codes which characterize said zones.

In this table, the generators set into operation for the different zones are represented by crosses located at the cross-points of the corresponding columns and lines.

Table III presents the logical conditions for which the different generators are set into operation for the generation of the pedestal voltages, these conditions being deduced immediately from Table II. Thus, it is seen that the generator GO1 must be started when at least one of the flip-flops B1, B2, B3, is in the 1 state, viz:

$$GO1=B1+B2+B3$$

In the same way, the generator G42, for instance, is started only for the condition $G42=C''3+C''4$.

TABLE III

| Generator | Injection point | Logical condition |
|---|---|---|
| GO1 | Qo | B1+B2+B3 |
| G21 | Q2 | B1+C'1+C'2 |
| G41 | Q4 | B1+C'1 |
| G61 | Q6 | B1 |
| G62 | Q6 | C''2+C''3+C''4 |
| G42 | Q4 | C''3+C''4 |
| G22 | Q2 | C''4 |

It will be noted that the generators GO1, G21, G41 and G61 are started, in particular, by a signal B1. In effect, it is seen on Table II that these generators are simultaneously started when the first flip-flop of the register is in the 1 state.

One will now describe the mode of generation of the complementary voltage which depends, as it has been seen previously, upon the position of the code in the zone to which it belongs.

As it has been seen previously, the generators G$a$, G$b$, G$c$, which are controlled, respectively, by the flip-flops B4, B5 and B6, supply currents of amplitude $I/2$, $I/4$, $I/8$, which are added in the conductor F and injected in one of the points Q$o$, Q2, Q4 or Q6 of the ladder attenuator. The current injected in the attenuator is, thus, proportional to the value of the number constituted by the digits of rank 4, 5 and 6 of the code.

If one considers, for instance, the maximum code belonging to the zone C'4 (decimal equivalent: 7), the current in the conductor F is equal to $7I/8$ and it will be injected at the point Q$o$ of the attenuator in the same way as the current I which generates the pedestal voltage U'$o$ characterizing the value of the next code, (decimal equivalent: 8). For the following zones of index 3, 2, 1, the complementary currents will be injected at points Q2, Q4, Q6.

In order to carry out this switching, the conductor F is connected to the gates P$o$, P2, P4, P6, which are energized, respectively, by the signals C4, C3, C2, C1.

Figure 1A:
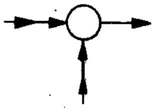
Figure 1B:
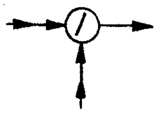
Figure 1C:
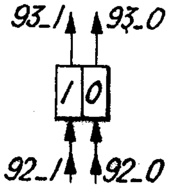
Figure 1D:
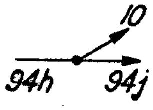
Figure 1E:
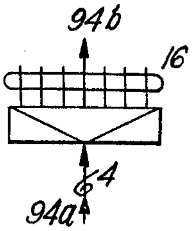
Figure 1F:
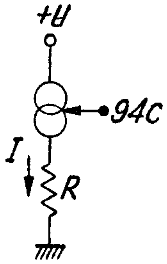
Figure 1G:
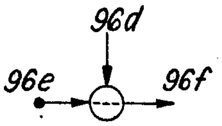
Figure 4:
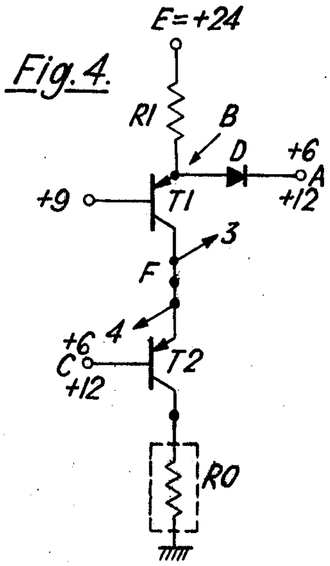
FIG. 4 represents the diagram of the circuits used in the generation of the complementary voltage.

FIG. 4 represents, in a symbolic form, the diagram of the circuits involved in the generation of the complementary voltages.

The transistor T1, the resistance R1, and the diode D, constitute one of the current generators G$a$, G$b$, G$c$, to which the control signal is applied at the point A. The whole of these generators is represented symbolically by the multiplexing arrow bearing the figure "3." The conductor F is multiplexed on the four inputs of the ladder attenuator and the transistor T2 constitutes one of the gates P$o$, P2, P4, P6, to which the control signal is applied at the point C. The resistance R$o$ represents the characteristic impedance of the attenuator which constituted the load impedance of the circuit.

VA, VB, VC will designate the voltages at the points A, B, C, and the two levels of the control signals will be chosen equal to +6 volts and +12 volts. Under these conditions:

(a) For $VA=+6$, the diode D is the only conducting diode and one has $VB=+6.5$ volts, so that the transistor T1 is blocked;

(b) For $VA=+12$, the diode D is blocked, the base-emitter junction of the transistor T1 is conducting, and one has $VB=+9.5$ volts. This voltage constitutes the control signal of the current generator;

(c) For $VC=+12$, the transistor T2 is blocked, whatever may be the state of the transistor T1;

(d) For $VC=+6$, the base-emitter junction of the transistor T2 is conducting.

This voltage constitutes the control signal of the electronic gate.

In order to obtain the constant current operation, the transistor T1 must not be saturated, i.e., its collector-emitter voltage must be lower than the saturation voltage $V_{ces}$ of the transistor. This is obtained for a given value of the resistance $R_o$ by acting over the value of the resistance R1. Besides, the internal resistance of the current generator (resistance R1 in series with the output resistance of the transistor T1) must be chosen high with respect to $R_o$, in such a way that the addition of currents is carried out in an accurate way in the conductor F.

While the principles of the above invention have been described in connection with specific embodiments and particular modifications thereof, it is to be clearly understood that this description is made by way of example and not as a limitation of the scope of the invention.

We claim:

1. A nonlinear decoder for translating $n$-digit binary code groups into voltages represented thereby having a nonlinear code group input vs. voltage output characteristic formed from a plurality of successive straight line segments each having a different slope and extending from a different lower value of voltage to a different higher value of voltage comprising:

first means for storing the digits of each of said code groups;

second means coupled to said first means responsive to the $x$ most significant weight digits of a stored code group to produce a first signal indicating the lower value of voltage of the segment of said characteristic represented by said stored code groups, where $x$ is an integer less than $n$;

third means coupled to said first means responsive to the $m$ least significant weight digits of said stored code group to produce a second signal indicating the position along said segment indicated by said first signal, where $m$ is an integer less than $n$; and fourth means coupled to said first means, said second means and said third means responsive to said first signal and at least the condition of the most significant weight digit of said stored code group to produce a first voltage equal to said lower value of voltage of said segment indicated by said first signal, responsive to said first signal and said second signal to produce a second voltage corresponding to said position indicated by said second signal, and to sum said first and second voltages to produce an output voltage represented by said stored code group.

2. A decoder according to claim 1, wherein said third means includes $m$ current generator means each generating a different predetermined value of current and coupled to said first means for activation by the condition of different ones of said $m$ least significant weight digit, and output means coupled in common to said $m$ current generator means to provide said second signal.

3. A decoder according to claim 1, wherein said fourth means includes a weighting and summing means having a plurality of signal input points, a current generator means coupled to each of said signal input points, fifth means coupled to each of said current generator means, said first means and said second means responsive to said first signal and at least the condition of the most significant weight digit of said stored code group to produce an activation signal for said current generator means, and sixth means coupled to each of said signal input points and said second means under control of said first signal to inject said second signal into appropriate ones of said signal input points.

4. A decoder according to claim 3, wherein said fifth means produces an activation signal for one of said current generator means in response to the condition of said $x$ most significant weight digits of said stored code group.

5. A decoder according to claim 3, wherein said third means includes $m$ current generators each generating a different predetermined value of current and coupled to said first means for activation by the condition of different ones of said $m$ least significant weight digit, and output means coupled to said sixth means and in common to said $m$ current generators to provide said second signal.

6. A decoder according to claim 1, wherein said first means includes $n$ bistable devices for storing individual ones of the $n$ digits of said stored code group, each of said devices having a "1" output and a "0" output;

said second means being coupled to both said "1" output and said "0" output of said devices storing said $x$ most significant weight digits;

said third means being coupled to said "1" output of said devices storing said $m$ least significant weight digits; and said fourth means being coupled to said "1" output of said device storing said most significant weight digit.

7. A decoder according to claim 6, wherein said second means includes a decoding means coupled to both said "1" output and said "0" output of said devices storing said $x$ most significant weight digits having a plurality of output terminals related to the number of said segments of said characteristic, at least one of said output terminals being activated to provide said first signal.

8. A decoder according to claim 7, wherein said third means includes $m$ current generators each generating a different predetermined value of current and coupled to said "1" output of a different one of said devices storing said $m$ least significant weight digits for activation thereof when said "1" output of the associated one of said devices is high, and common output means coupled to each of said $m$ current generators to provide said second signal.

9. A decoder according to claim 8, wherein said fourth means includes a weighting and summing means having $m+1$ resistive networks coupled in series with each other and a summing output terminal, a signal input terminal for each of said resistive networks, a first current generator coupled to one of said signal input terminals, an OR gate coupled to said first current generator and said "1" output of said $x$ most significant digits to activate said first current generator, a pair of current generators coupled to the remainder of said signal input terminals, fifth means coupled to said pairs of current generators, selected ones of said output terminals, and said "1" output of said device storing said most significant weight digit to activate appropriate ones of the current generators of said pairs of current generators, an AND gate coupled to each of said signal input terminals and said common output means, means coupling each of said AND gates to a different selected one of said output terminals to appropriately activate said AND gates and couple said second signal to the associated one of said signal input terminals.

10. A decoder according to claim 9, wherein said weighting and summing means is a ladder attenuator;
$n$ is equal to six;
$m$ is equal to three; and
$x$ is equal to three.

References Cited

UNITED STATES PATENTS

| | | | |
|---|---|---|---|
| 3,290,671 | 12/1966 | Lamourex | 340—347 |
| 3,298,017 | 1/1967 | Avignon | 340—347 |
| 3,305,855 | 2/1967 | Kaneko | 340—347 |
| 3,305,857 | 2/1967 | Barber | 340—347 |
| 3,345,505 | 10/1967 | Schmid | 340—347 |

MAYNARD R. WILBUR, Primary Examiner
J. GLASSMAN, Assistant Examiner